United States Patent
Huang et al.

(10) Patent No.: US 7,599,030 B2
(45) Date of Patent: Oct. 6, 2009

(54) PIXEL STRUCTURE

(75) Inventors: Yi-Pai Huang, Chiayi (TW); Ting-Jui Chang, Taipei (TW); Po-Lun Chen, Chiayi (TW); Cheng-Han Tsao, Banciao (TW)

(73) Assignee: AU Optronics Corp., Hsinchu (TW)

( * ) Notice: Subject to any disclaimer, the term of this patent is extended or adjusted under 35 U.S.C. 154(b) by 504 days.

(21) Appl. No.: 11/428,617

(22) Filed: Jul. 5, 2006

(65) Prior Publication Data

US 2007/0126965 A1 Jun. 7, 2007

(30) Foreign Application Priority Data

Dec. 1, 2005 (TW) .............................. 94142320 A

(51) Int. Cl.
*G02F 1/1337* (2006.01)

(52) U.S. Cl. .................. 349/129; 349/139; 349/144

(58) Field of Classification Search .................. 349/129, 349/99, 103, 87, 128, 127, 134, 136, 139, 349/144, 158, 194, 149, 152, 121
See application file for complete search history.

(56) References Cited

U.S. PATENT DOCUMENTS

| | | | |
|---|---|---|---|
| 7,450,208 B2 * | 11/2008 | Lu et al. ................... | 349/129 |
| 7,466,385 B2 * | 12/2008 | Lu et al. ................... | 349/139 |
| 7,483,105 B2 | 1/2009 | Jun et al. ................... | 349/139 |
| 2004/0178980 A1 | 9/2004 | Rao et al. ................... | 345/96 |
| 2006/0139540 A1 * | 6/2006 | Lu et al. ................... | 349/129 |
| 2007/0126965 A1 * | 6/2007 | Huang et al. ............... | 349/129 |
| 2007/0177067 A1 | 8/2007 | Kim et al. ................... | 349/43 |
| 2007/0268438 A1 * | 11/2007 | Nakamura et al. .......... | 349/138 |
| 2009/0086141 A1 * | 4/2009 | Shoraku et al. ............ | 349/123 |

FOREIGN PATENT DOCUMENTS

| | | |
|---|---|---|
| CN | 1588213 | 3/2005 |
| CN | 1625714 | 6/2005 |
| JP | 2001125144 | 5/2001 |
| TW | 544934 | 8/2003 |
| TW | 594164 | 6/2004 |
| TW | 200510836 | 3/2005 |

OTHER PUBLICATIONS

English Abstract of JP2001125144.
CN Office Action issued Oct. 19, 2007.
CN Office Action mailed Apr. 6, 2007.
English abstract of TW544934.
English abstract of TW594164.
English abstract of TW200510836.

* cited by examiner

*Primary Examiner*—Brian M Healy
(74) *Attorney, Agent, or Firm*—Thomas, Kayden, Horstemeyer & Risley

(57) ABSTRACT

A pixel structure for a multi-domain vertical alignment liquid crystal display (MVA-LCD) is disclosed. The pixel structure includes a pixel array having a plurality of adjacently arranged sub-pixels; and a first substrate and a second substrate having, respectively, first and second means for controlling tilt angles of liquid crystal molecules between the first and second substrates. The first and second means are alternately disposed to define each of the sub-pixels into a plurality of different azimuthal angle domains. Moreover, each of the sub-pixels also is further defined into at least two different polar angle domains. The azimuthal angle domains and polar angle domains of two adjacent sub-pixels have a mirror-image arrangement.

33 Claims, 15 Drawing Sheets

|   | R | G | B |   |   |   |
|---|---|---|---|---|---|---|
|   | P | N | P | N | P | N |
|   | N | P | N | P | N | P |

|   | R | G | B |   |   |   |
|---|---|---|---|---|---|---|
|   | P | P | P | N | N | N |
|   | N | N | N | P | P | P |

| R | G | B | | | | | | | | | |
|---|---|---|---|---|---|---|---|---|---|---|---|
| P | P | P | P | P | P | N | N | N | N | N | N |
| N | N | N | N | N | N | P | P | P | P | P | P |
| P | P | P | P | P | P | N | N | N | N | N | N |
| N | N | N | N | N | N | P | P | P | P | P | P |

| R | G | B | | | | | | | | | |
|---|---|---|---|---|---|---|---|---|---|---|---|
| P | P | P | N | N | N | P | P | P | N | N | N |
| P | P | P | N | N | N | P | P | P | N | N | N |
| N | N | N | P | P | P | N | N | N | P | P | P |
| N | N | N | P | P | P | N | N | N | P | P | P |

FIG. 16

PIXEL STRUCTURE

BACKGROUND OF THE INVENTION

1. Field of the Invention

The invention relates to a multi-domain vertical alignment liquid crystal display, and in particular to a pixel structure for a wide viewing angle liquid crystal display capable of improving display quality.

2. Description of the Related Art

In modern thin film transistor liquid crystal displays, characteristics such as high contrast ratio, high luminescence, low color shift, no gray scale inversion, no image retention, high response speed, and wide viewing angle are desirable.

A narrow viewing angle, however, has existed in conventional thin film transistor liquid crystal displays. To increase viewing angle, one technique, dividing liquid crystal into multi-domains where liquid molecules are in various declination directions, has been proposed. Typically, a combination of a protruding portion and a conductive electrode with a slit is utilized in, for example, a multi-domain vertical alignment liquid crystal display. Moreover, the protruding portion and conductive electrode with a slit are disposed respectively on upper and lower substrates, opposing a liquid crystal layer between the substrates, thus the liquid crystal molecules have a pre-tilt angle. The liquid crystal molecules may have various declination directions when a voltage is applied.

FIG. 1 is a plan view of a pixel structure for a conventional multi-domain vertical alignment liquid crystal display. Referring to FIG. 1, one sub-pixel 200 of a conventional multi-domain vertical alignment liquid crystal display comprises protrusion 100 on a color filter substrate, a slit containing conductive electrode 104 on an array substrate. By means of a staggered arrangement of the protrusion and slit, liquid crystal molecules are set in four different declination directions, leading to formation of four different azimuthal angle domains. Thus a wide viewing angle can be achieved. However, as shown in FIG. 1, the width P0' of the first azimuthal angle domain is equal to the width P0 of the second azimuthal angle domain, thus the azimuthal angle domains on both sides of the protrusion 100 in a sub-pixel are unequal in area. For example, the first 202 and second 204 azimuthal angle domains are unequal in area, the overall display quality may be affected by problems such as color washout and gray scale inversion. FIG. 2 is a diagram showing the relationship of the γ curve vs. the viewing angle for a conventional multi-domain vertical alignment liquid crystal display. As shown in FIG. 2, curves A, B and C denote γ curves at viewing angle 0°, right viewing angle and left viewing angle, respectively. It is Note that curves B and C are far away from each other.

To ameliorate the drawbacks, another technique is proposed, as shown in FIG. 3. In a sub-pixel 200', each azimuthal angle domain is equal because the areas of azimuthal angle domains are adjusted by means of altering the position of the protrusion 100. The width P2' of the first azimuthal angle domain 202', however, is not equal to the width P2 of the second azimuthal angle domain 204'; the width P1 of the third azimuthal angle domain 206' is not equal to the width P1 of the second azimuthal angle domain 208'. As a result, other problems such as image retention, low response speed and gray scale inversion may occur while the drawbacks are compensated by altering the position of the protrusion 100. Image retention is induced by unstable disconnection lines resulting from various disordering forces among liquid crystal molecules in a sub-pixel when P1≠P1', P2≠P2'. Low response speed is caused by weaking forces among liquid crystal molecules when P1' and P2' are too long.

"Gray scale inversion" occurs because some azimuthal angle domains may be dramatically diminished due to alignment errors when P1 and P2 are too small.

Accordingly, a wide viewing angle liquid crystal display capable of improving display quality is desirable.

BRIEF SUMMARY OF THE INVENTION

One embodiment of the invention provides a multi-domain vertical alignment liquid crystal display having a mirror-image arrangement capable of solving problems such as uneven display quality at left-right viewing angle, or color shift due to azimuthal angle domains with unequal area ratio in a single sub-pixel, and problems such as image retention occurring in a single sub-pixel where azimuthal angle domains are equal in area ratio.

Another embodiment of the invention features two adjacent sub-pixels set in a cyclic disposition of mirror mapping with respect to a horizontal or vertical line, and each kind of azimuthal angle domain in the same polar angle domain is substantially equal in total area. Thus, characteristics such as azimuthal angle domain area ratio self compensation are obtained.

One embodiment of the invention provides a pixel structure for a multi-domain vertical alignment liquid crystal display, comprising a pixel array comprising a plurality of adjacently arranged sub-pixels; a first substrate comprising a first means; and a second substrate comprising a second means, and a layer of liquid crystal molecules interposed between the first and second substrates, wherein the first and second means are employed for controlling tilt angles of the liquid crystal molecules; wherein the first and second means are alternately disposed to divide each of the sub-pixels into a plurality of different azimuthal angle domains; wherein each of the sub-pixels comprises at least two different polar angle domains, and wherein the azimuthal angle domains and polar angle domains of two adjacent sub-pixels have a mirror-image arrangement.

Another embodiment of the invention provides a pixel structure for a multi-domain vertical alignment liquid crystal display, comprising a pixel array comprising a plurality of adjacently arranged sub-pixels; a liquid crystal layer interposed between first and second substrates; wherein one sub-pixel of the second substrate comprises a first polar domain and a second polar domain at different potential, and both first and second polar domains are further divided into a plurality of azimuthal domains; wherein at least one adjacent sub-pixel comprises the polar domains and the azimuthal domains in a mirror-image arrangement; an active device is electrically connected to the first polar domain of the second substrate via a data line; and a capacitive coupling electrode which is disposed below the second polar domain is electrically connected to the data line through the active device.

Note that the mirror-image arrangement of adjacent sub-pixels refers to the periodic arrangement of every three sub-pixels and every three mirror-images of the sub-pixels. These sub-pixels comprise red, green and blue sub-pixels. The first and second means comprise a protrusion portion or a slit. Specifically, with the use of a charge releasing device, remaining charge in the pixel can be efficiently released when data is written. The charge releasing device comprises a capacitor or thin film transistor.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 13 shows pixel structure arrangement of a fifth embodiment of a multi-domain vertical alignment liquid crystal display.

FIG. 14 shows pixel structure arrangement of a sixth embodiment of a multi-domain vertical alignment liquid crystal display.

FIG. 15 shows pixel structure arrangement of a seventh embodiment of a multi-domain vertical alignment liquid crystal display.

FIG. 16 shows pixel structure arrangement of an eighth embodiment of a multi-domain vertical alignment liquid crystal display.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

To address issues such as color washout of the related art, a first embodiment discloses two adjacent sub-pixels 1000 and 1000' mirror mapped with respect to a vertical line. The polar angle domain I', II' have a mirror-image arrangement, and the azimuthal angle domain 10 I', 20I', 30I', 40I', 50II', 60II', 70II', 80II' also have a mirror-image arrangement. Moreover, in two adjacent mirror mapped sub-pixels, each kind of azimuthal angle domains in a same polar angle domain is substantially equal in total area.

First Embodiment

Figure 1:
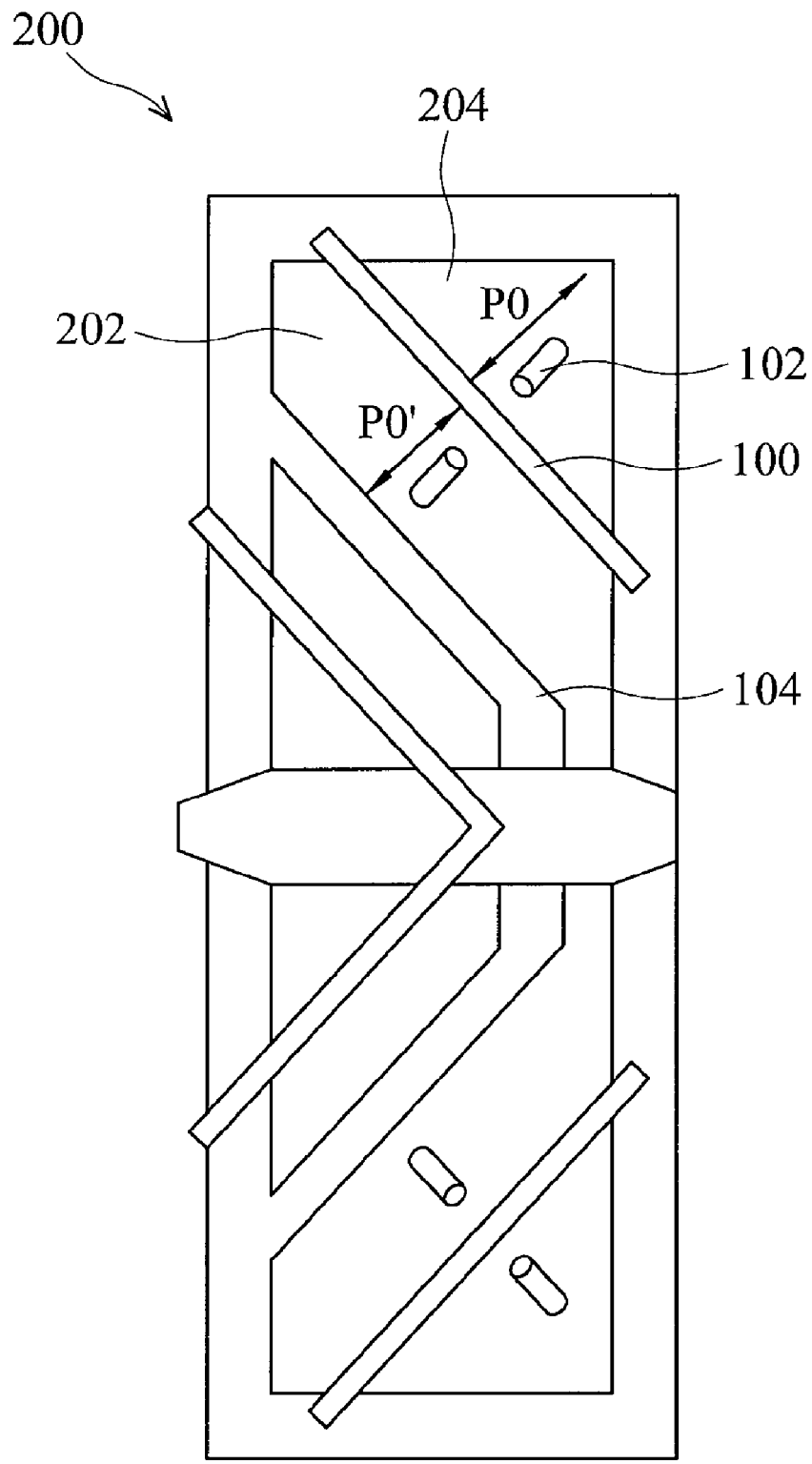
FIG. 1 is a plan view of a pixel structure for a conventional multi-domain vertical alignment liquid crystal display.
Figure 2:
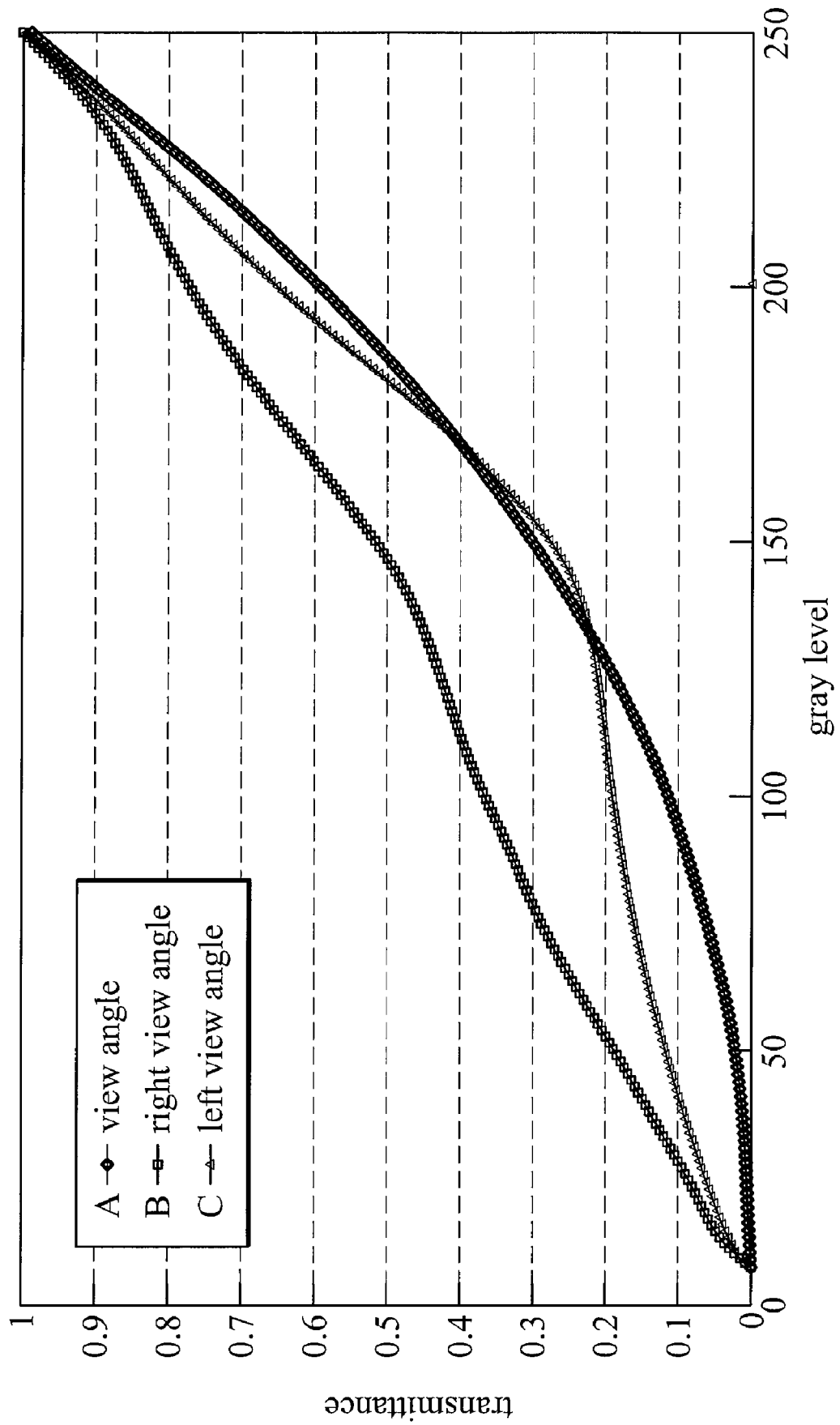
FIG. 2 is a diagram showing the relationship of the γ curve vs. the viewing angle of a conventional multi-domain vertical alignment liquid crystal display.
Figure 3:
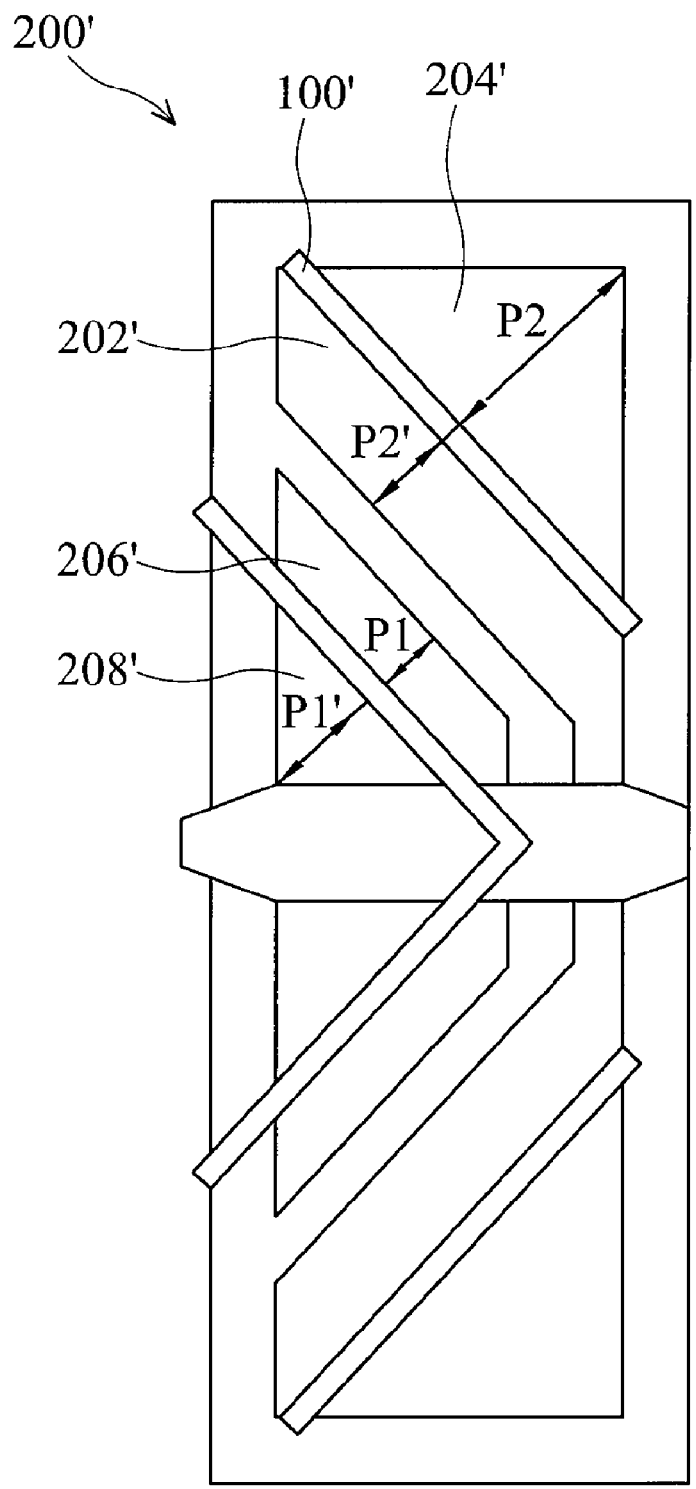
FIG. 3 is a plan view of a pixel structure for a conventional multi-domain vertical alignment liquid crystal display.
Figure 4:
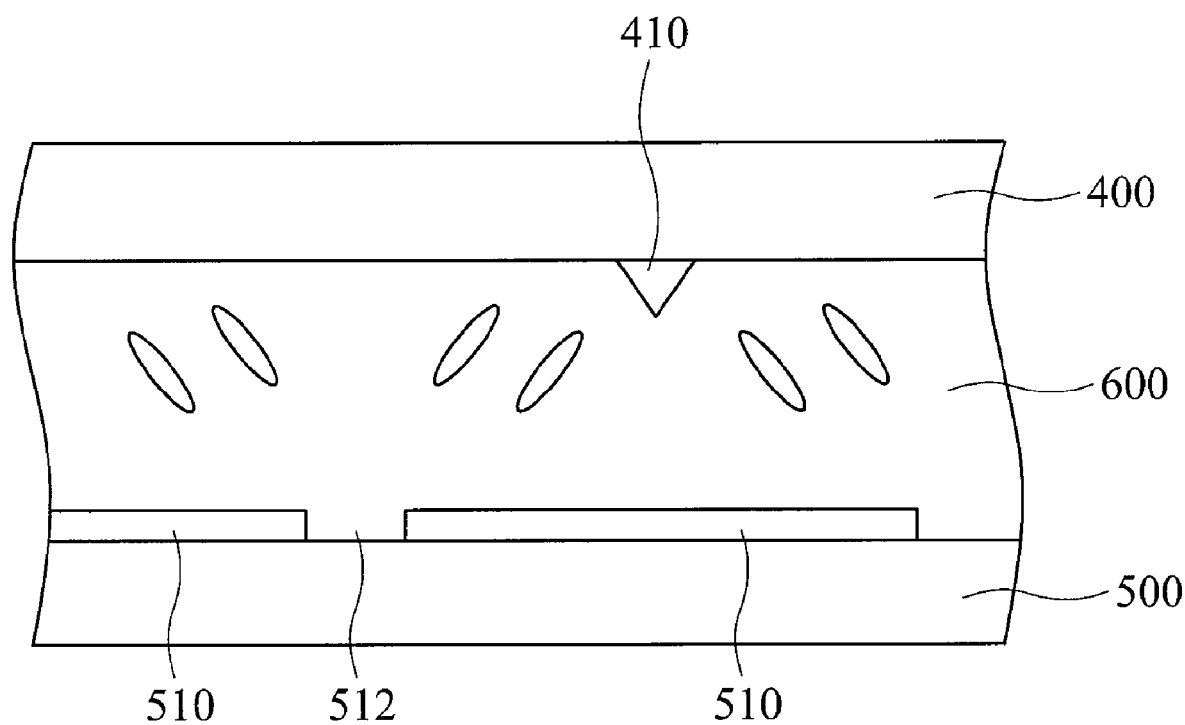
FIG. 4 shows cross section of a multi-domain vertical alignment liquid crystal display of one embodiment of the invention.
Figure 5:
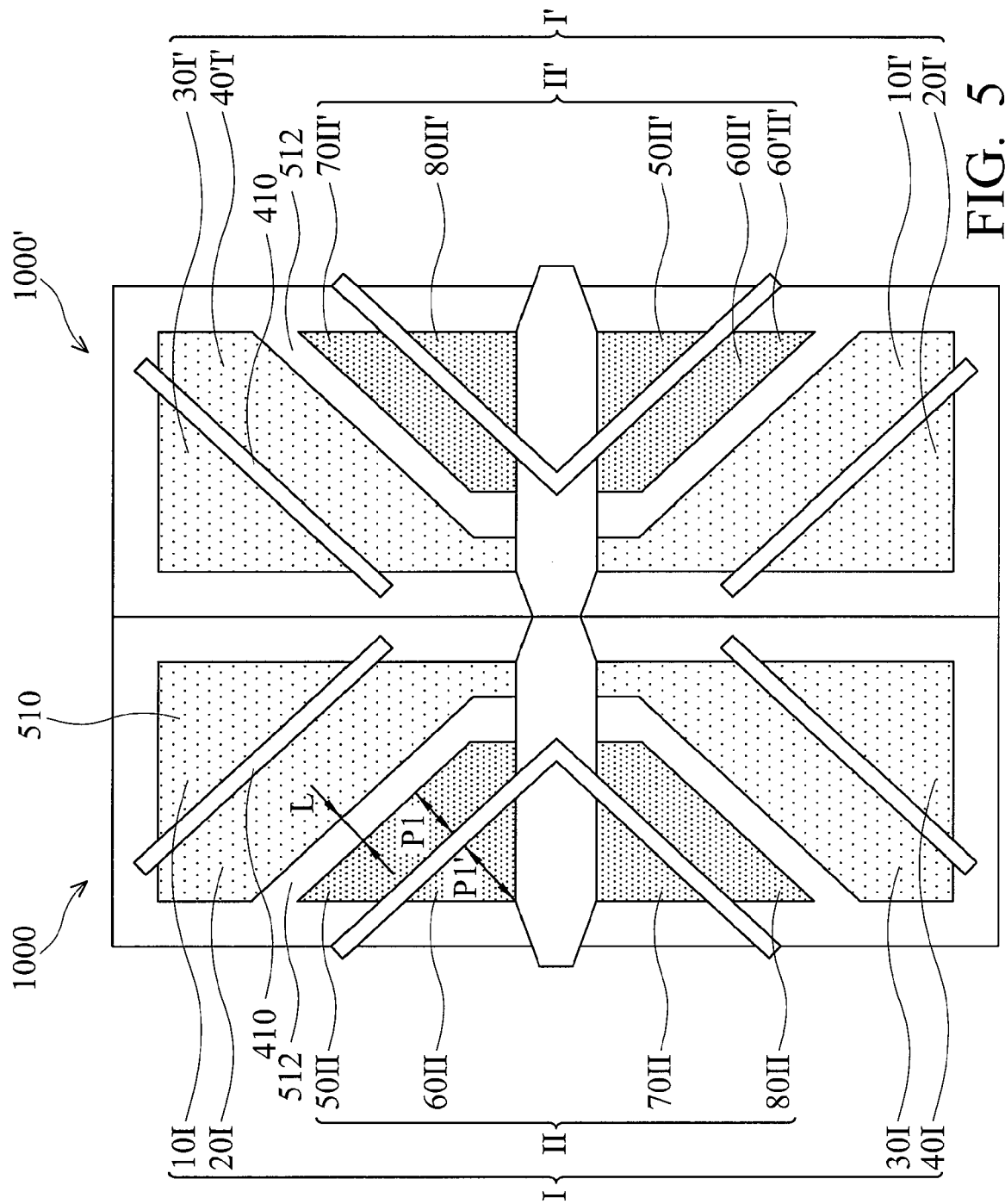
FIG. 5 is a plan view of a first embodiment of a multi-domain vertical alignment liquid crystal display.
Figure 6:
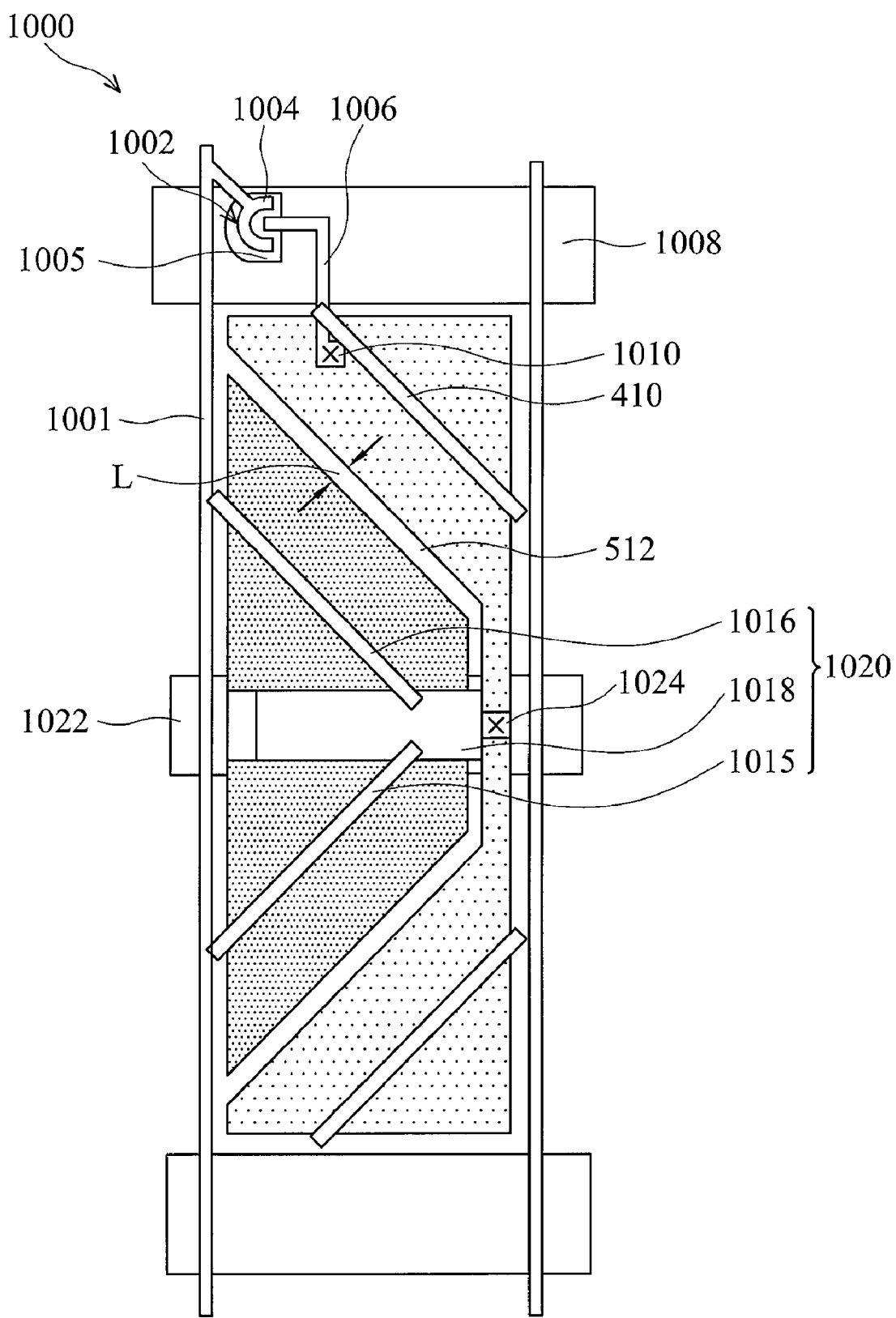
FIG. 6 is a top view of a first embodiment of a multi-domain vertical alignment liquid crystal display.

FIG. 4 shows a cross section of a multi-domain vertical alignment liquid crystal display for one of the embodiments according to the invention. FIG. 5 is a plan view of a multi-domain vertical alignment liquid crystal display for a first embodiment according to the invention. FIG. 6 is a top view of a first embodiment of a multi-domain vertical alignment liquid crystal display. In this embodiment, as shown in FIGS. 4, 5 and 6, a sub-pixel 1000 includes a color filter substrate 400, an array substrate 500 and a liquid crystal layer 600 therebetween. A first means 410 on the color filter substrate 400 and a second means 512 on the array substrate 500, for aligning liquid crystal molecules, are set in a stagger arrangement to divide a sub-pixel into a plurality of azimuthal angle domains 10 I, 20I, 30I, 40I, 50II, 60II, 70II, 80II. The azimuthal angle domains may be at an angle of 45°, 135°, 225°, 315°.

As shown in FIG. 4, the first means 410 and second means 512 can control the directional axis of liquid crystal molecules so as to form different kinds of azimuthal angle domains, thus increasing viewing angle. Those skilled in the art will recognize that first means 410 and second means 512 can be any combination of a protrusion and a slit, i.e. one proportion and one slit, both proportions, and both slits.

As shown in FIG. 5, the sub-pixel 1000 further comprises asymmetric polar angle domains I, II divided by an interval L, thus the pixel electrode on the polar angle domains I, II is a stand-alone structure. It is Note that the interval L can be formed by the second means 512.

As shown in FIG. 5, in adjacent sub-pixels 1000' and 1000, polar angle domains I', II' and azimuthal angle domains are set in a cyclic disposition of mirror mapping, thereby compensating the viewing angle. For example, in sub-pixel 1000', azimuthal angle domains 10I', 50II' can be at 45°; azimuthal angle domains 20I', 60II' can be at 135°; azimuthal angle domains 30I', 70II' can be at 225°; azimuthal angle domains 40I', 80II' can be at 315°.

Moreover, in two adjacent mirror mapped sub-pixels 1000 and 1000', each kind of azimuthal angle domains in a same polar angle domain is substantially equal in total area. For example, the total area of domains 10I and 10I' are substantially identical to that of domains 20I and 20I', 30I and 30I', 10I and 10I'. Thus, characteristics such as azimuthal angle domain area ratio self compensation are obtained, and display quality of the panel in left-right, and up-down viewing angles is uniform. Problems such as gray scale inversion, image retention, low response speed induced by alignment errors resulting from altering positions of the protrusions are eliminated.

As shown in FIG. 5, liquid crystal molecules may produce two different polar angle domains when first and second polar angle domains are maintained at two different kinds of potential. Besides, with use of the first means 410 and second means 512, liquid crystal molecules may produce four different kinds of polar angle domains, i.e. azimuthal angle domains 10I, 50II at 45°; azimuthal angle domains 20I, 60II at 135°; azimuthal angle domains 30I, 70II at 225°; azimuthal angle domains 40I, 80II at 315°. As a result, domains, such as 10I, 20I, 30I, 40I, 50II, 60II, 70II, 80II, with eight different kinds of optical characteristics can be obtained in various combinations of the two different kinds of potential and four different kinds of polar angle domains. Specifically, adjacent mirror mapped sub-pixels are set with respect to a vertical line so that each polar angle domain includes four azimuthal angle domains with same area. Accordingly, uniform display quality in the left-right viewing angle is also achieved.

Arrangement of devices in the sub-pixel 1000 and formation of the polar angle domains I, II will be described in the following.

As shown in FIG. 6, sub-pixel 1000 comprises an active device 1002 on an array substrate 500. The active device 1002 can be a thin film transistor including a gate 1008, a channel layer 1005, a source 1004, a drain 1006 and a storage capacitor (Cst) 1022 on the center of the sub-pixel 1000. A metal layer 1020 is disposed overlying the storage capacitor (Cst) 1022; gate 1008 is electrically connected to or directly integrated into scan lines (not shown ); the source 1004 is electrically connected to or directly integrated into data lines; and the drain 1006 is electrically connected to the first polar angle domain I via a contact 1010.

The metal layer 1020 comprises a first capacitive coupling electrode 1015, a metal wire 1018 and a second capacitive coupling electrode 1016. The first and second capacitive coupling electrodes 1015, 1016 are disposed on both side of the metal wire 1018, and cover the position corresponding to the first means 410 on the first polar angle domain I. The metal wire 1018 is electrically connected to the first polar angle domain I via a first contact 1024. The first and second capacitive coupling electrode 1015, 1016 are coupled to the second polar angle domain II, respectively, so as to maintain good display quality.

As shown in FIG. 6, when a high voltage $V_{gh}$ is applied to write image data into the sub-pixel 1000 via scan lines (not shown). The high voltage $V_{gh}$ turns on active device 1002. The first polar angle domain I is maintained at potential $V_{data}$. However, when image data is written into the first polar angle domain I, pixel electrode on the polar angle domain II is connected to the metal layer 1020 via the second contact 1024 so that the pixel electrode on the polar angle domain II is coupled to the first and second capacitive coupling electrodes 1015 and 1016. As a result, the pixel electrode on the polar angle domain II is pulled to potential $V_{cc}$, and $V_{data}>V_{cc}$. In the meantime, because of the difference in potential between the first and second polar angle domains I and II, the directional axis of liquid crystal molecules in the domains I and II have different declination directions. Thus, different first and second polar angle domains I, II are formed.

Second Embodiment

Figure 7:
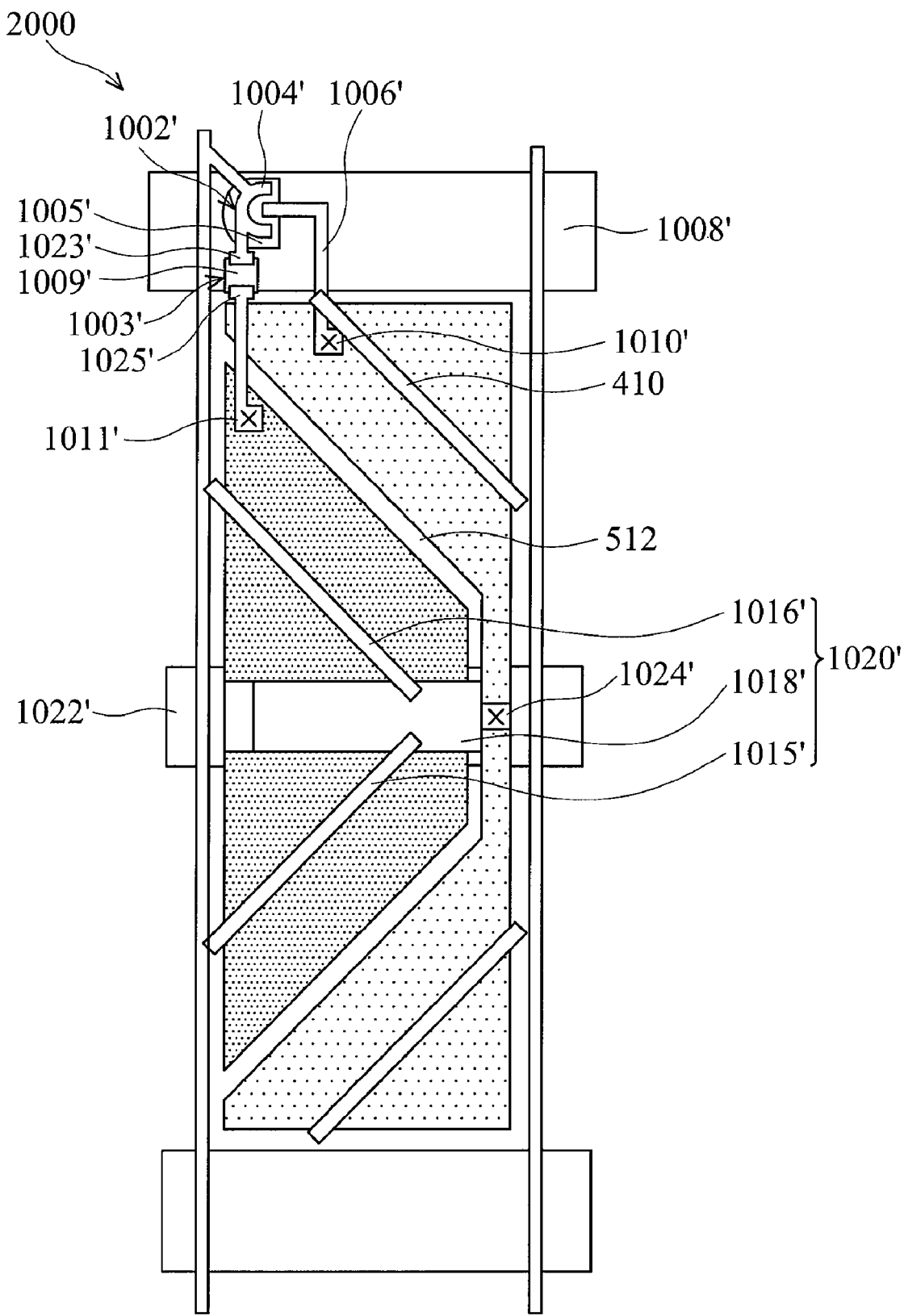
FIG. 7 is a top view of a second embodiment of a multi-domain vertical alignment liquid crystal display.

FIG. 7 is a top view of a pixel structure 2000 of a second embodiment of the invention. Pixel structure 2000 is similar to pixel structure 1000 except for the way of controlling polar angle domains; the main difference is as follows. That is, the sub-pixel 2000 is controlled by not only the first thin film transistor 1002' but also the second thin film transistor 1003' including a second gate 1008', a second source 1023', a second drain 1025' and a second channel layer 1009'. The second thin film transistor 1003' is electrically connected to the second polar angle domain II' through a second contact 1011'. The source 1004' of the first thin film transistor 1002' is electrically connected to the second source 1023' of the second thin film transistor. Specifically, the second gate 1008' serves as the gate of the first thin film transistor.

A W/L value of the second thin film transistor 1003' is less than that of the first thin film transistor 1002'. It is Note that the second thin film transistor 1003' may serve as a charge releasing device such as a storage capacitor. The charge releasing device efficiently prevents charges from remaining in the sub-pixels. If the charge releasing device is a capacitor, problems such as image sticking during long term operation can be eliminated.

Third Embodiment

Figure 8:
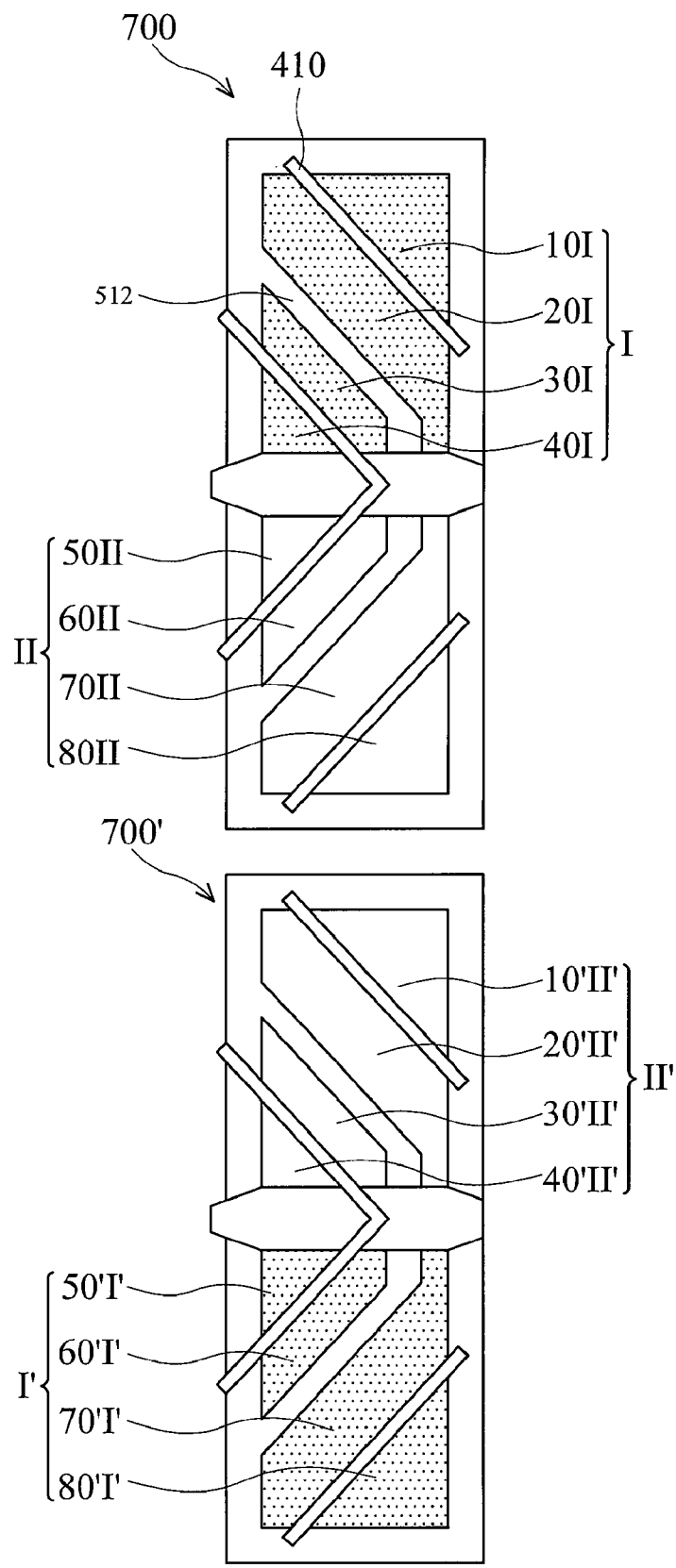
FIG. 8 is a plan view of a third embodiment of a multi-domain vertical alignment liquid crystal display.
Figure 9:
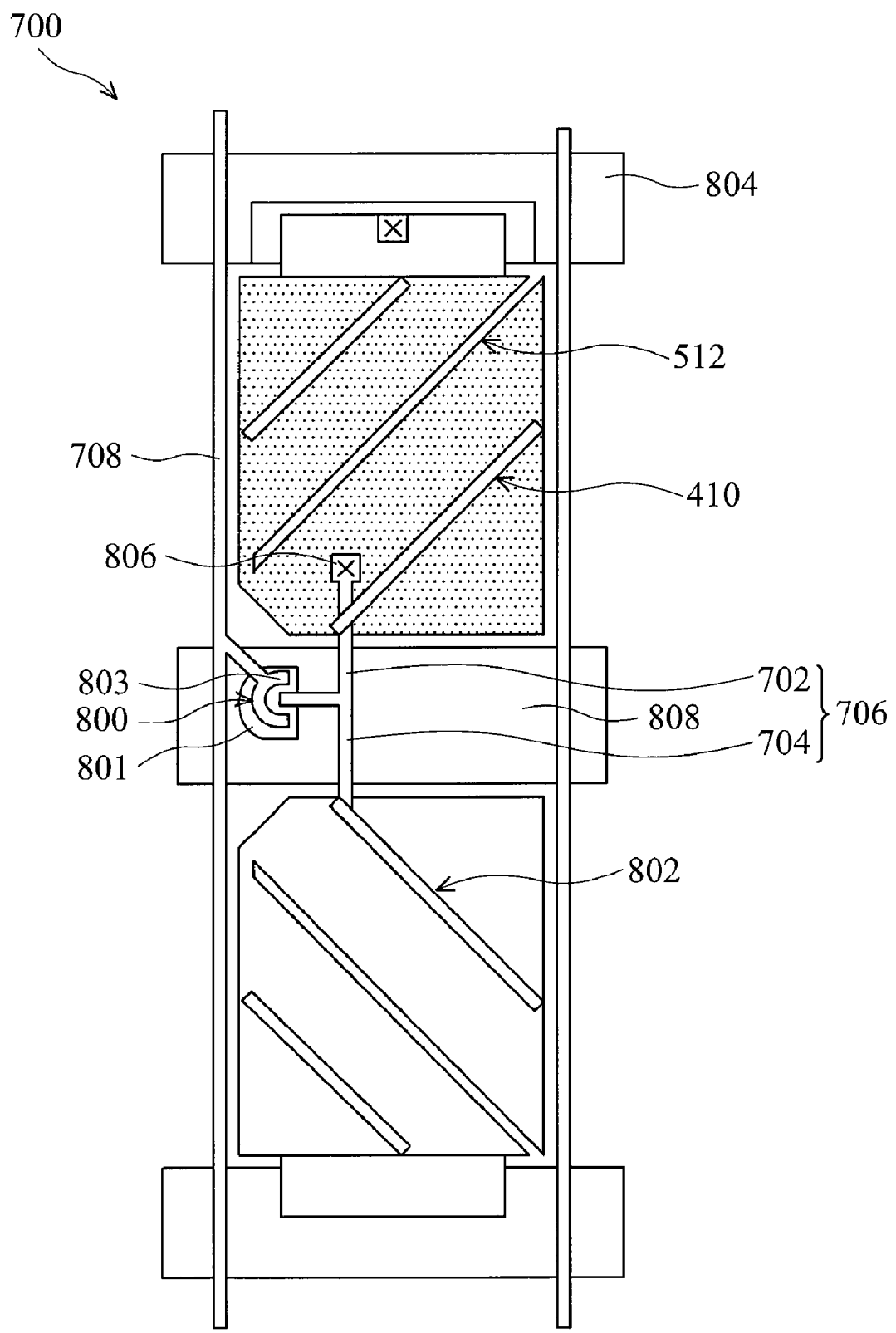
FIG. 9 is a top view of a third embodiment of a multi-domain vertical alignment liquid crystal display.

As shown in FIGS. 8 and 9, the third embodiment features a sub-pixel 700 including different mirror mapped polar angle domains I and II set with respect to a horizontal line. Specifically, a gate 808 or storage capacitor (Cst) 804 is utilized to divide the sub-pixel 700 into first and second polar angle domains I and II, thus the pixel electrode on the first and second polar angle domains I, II is a stand-alone structure.

As shown in FIG. 8, in adjacent sub-pixels 700' and 700 which are mirror mapped with respect to a horizontal line, polar angle domains I' and II' and azimuthal angle domains are set in a mirror mapped arrangement, thereby compensating the viewing angle. For example, in sub-pixel 700', azimuthal angle domains 10I', 30II' can be at 45°; azimuthal angle domains 20I', 40II' can be at 135°; azimuthal angle domains 50I', 70I' can be at 225°; azimuthal angle domains 60I', 80I' can be at 315°.

Moreover, in two adjacent sub-pixels 700 and 700' set in a disposition of mirror mapping with respect to a horizontal line, each kind of azimuthal angle domain in a same polar angle domain is substantially equal in total area. For example, the total area of domains 10I and 30I are substantially identical to that of domains 20I and 40I, of domains 50I' and 70I', of domains 60I' and 80I'. Thus, characteristics such as azimuthal angle domain area ratio self compensation are obtained.

As shown in FIG. 8, liquid crystal molecules may produce two different polar angle domains when first and second polar angle domains are maintained at two different kinds of potential. Additionally, with use of the first means 410 and second means 512, liquid crystal molecules may produce four different polar angle domains, i.e. azimuthal angle domains 10I, 30I at 45°; azimuthal angle domains 20I, 40I at 135°; azimuthal angle domains 50II, 70II at 225°; azimuthal angle domains 60II, 80II at 315°. As a result, domains, such as 10I, 20I, 30I, 40I, 50II, 60II, 70II, 80II, with eight different optical characteristics can be obtained by the various combinations of the two different potentials and four different polar angle domains. Specifically, adjacent mirror mapped sub-pixels are set with respect to a vertical line so that each polar angle domain includes four azimuthal angle domains with the same area. Accordingly, uniform display quality in the left-right viewing angle is achieved.

Arrangement of devices in the sub-pixel 1000 and formation of the polar angle domains I, II will be described as follows.

As shown in FIG. 9, sub-pixel 700 comprises an active device 800 on an array substrate 500. The active device 800 can be a thin film transistor including a gate 808, a channel layer 801, a source 803, a drain 706 and a storage capacitor (Cst) 804. The gate 808 or storage capacitor (Cst) 804 divide the sub-pixel 700 into first and second polar angle domains, and the pixel electrode on the first and second polar angle domains are stand-alone structures. The gate 808 is electrically connected to or directly integrated into scan lines (not shown); the source 803 is electrically connected to or directly integrated into data lines 708. The drain 1006 comprises a first portion 702 and a second portion 704. The first portion 702 is electrically connected to the first polar angle domain I via a contact 806. The second portion 704 is electrically connected to the capacitive coupling electrode 802 underlying the pixel electrode on the second polar angle domain II, and the capacitive coupling electrode 802 is coupled to the pixel electrode on the second polar angle domain II. In the meantime, due to the difference of potential between the first and second polar angle domains I and II so that director axis of liquid crystal molecules in the domains I and II have different declination directions. Thus, different first and second polar angle domains I and II are formed.

As shown in FIG. 9, when a high voltage $V_{gh}$ is applied to write image data into the sub-pixel 700 via scan lines (not shown). The high voltage $V_{gh}$ turns on the active device 800. The first polar angle domain I is maintained at potential $V_{data}$. However, when image data is written into the first polar angle domain I, the second portion 704 is electrically connected to the capacitive coupling electrode 802 underlying the pixel electrode on the second polar angle domain II, and the capacitive coupling electrode 802 is coupled to the pixel electrode on the second polar angle domain II. In the meantime, because of the difference in potentials between the first and second polar angle domains I and II so that directional axis of liquid crystal molecules in the domains I and II have different declination directions. Thus, different first and second polar angle domains I and II are formed.

Fourth Embodiment

Figure 10:
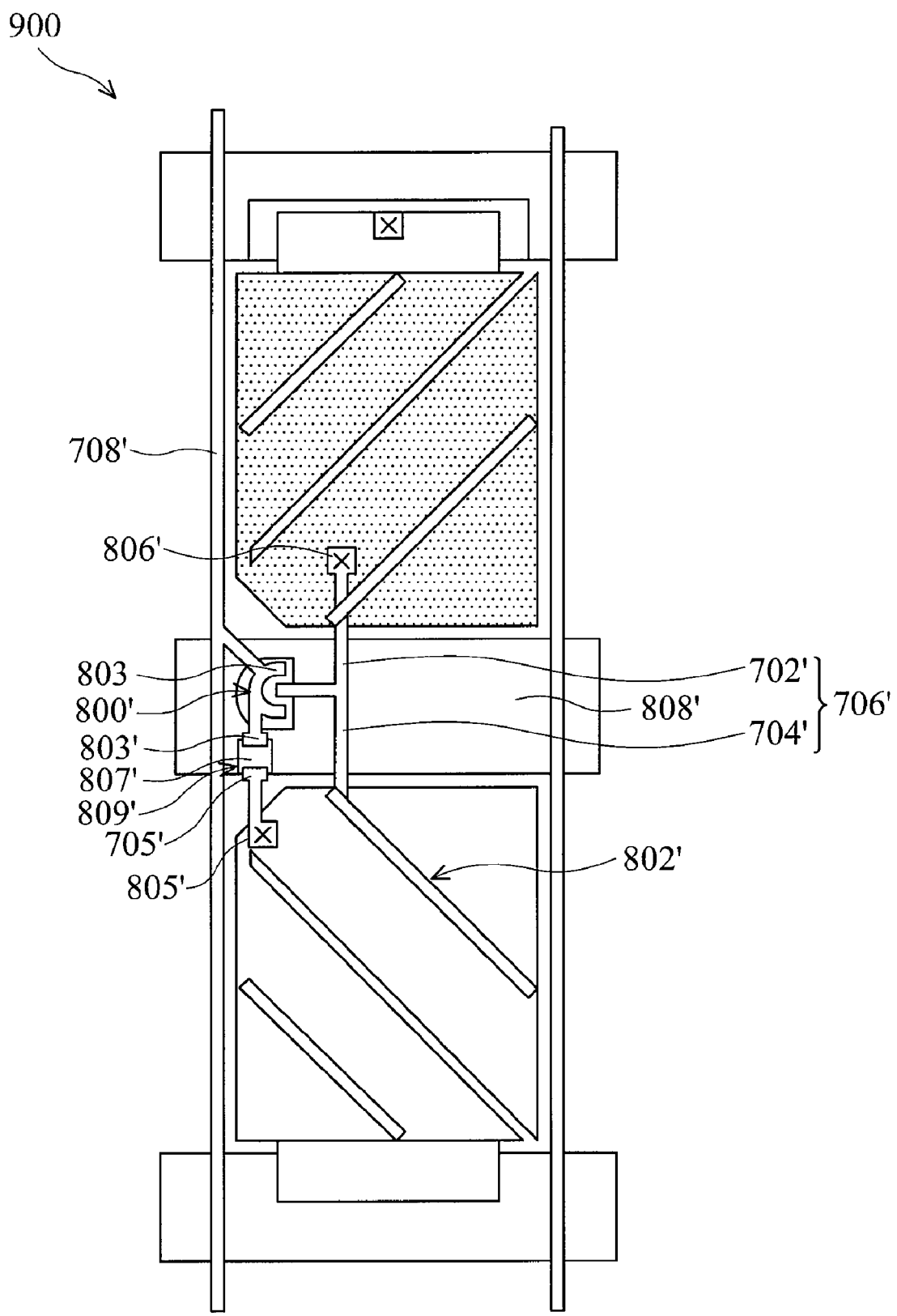
FIG. 10 is a top view of a fourth embodiment of a multi-domain vertical alignment liquid crystal display.

FIG. 10 is a top view of a pixel structure 900 of a second embodiment of the invention. Pixel structure 900 is similar to pixel structure 700 except for the method of controlling polar angle domains; the main difference is as follows. The sub-pixel 900 is controlled by not only the first thin film transistor 800' but also the second thin film transistor 809' including a second gate 808', a second source 803', a second drain 705' and a second channel layer 807'. The second thin film transistor 809' is electrically connected to the second polar angle domain II through a second contact 805'. The source 803 of the first thin film transistor is electrically connected to the second source 803' of the second thin film transistor. Specifically, the second gate 808' may serve as the gate 808 of the first thin film transistor 800'. A W/L value of the second thin film transistor 809' is less than that of the first thin film transistor 800'. The second thin film transistor 809' may serve as a charge releasing device such as a storage capacitor.

Note that the charge releasing device plays a very important role in the sub-pixel 900. That is, the charge releasing device can efficiently prevent charges from remaining in the sub-pixels. If the charge releasing device is a capacitor, problems such as image retention during long term operation can be eliminated.

Fifth Embodiment

Figure 11:
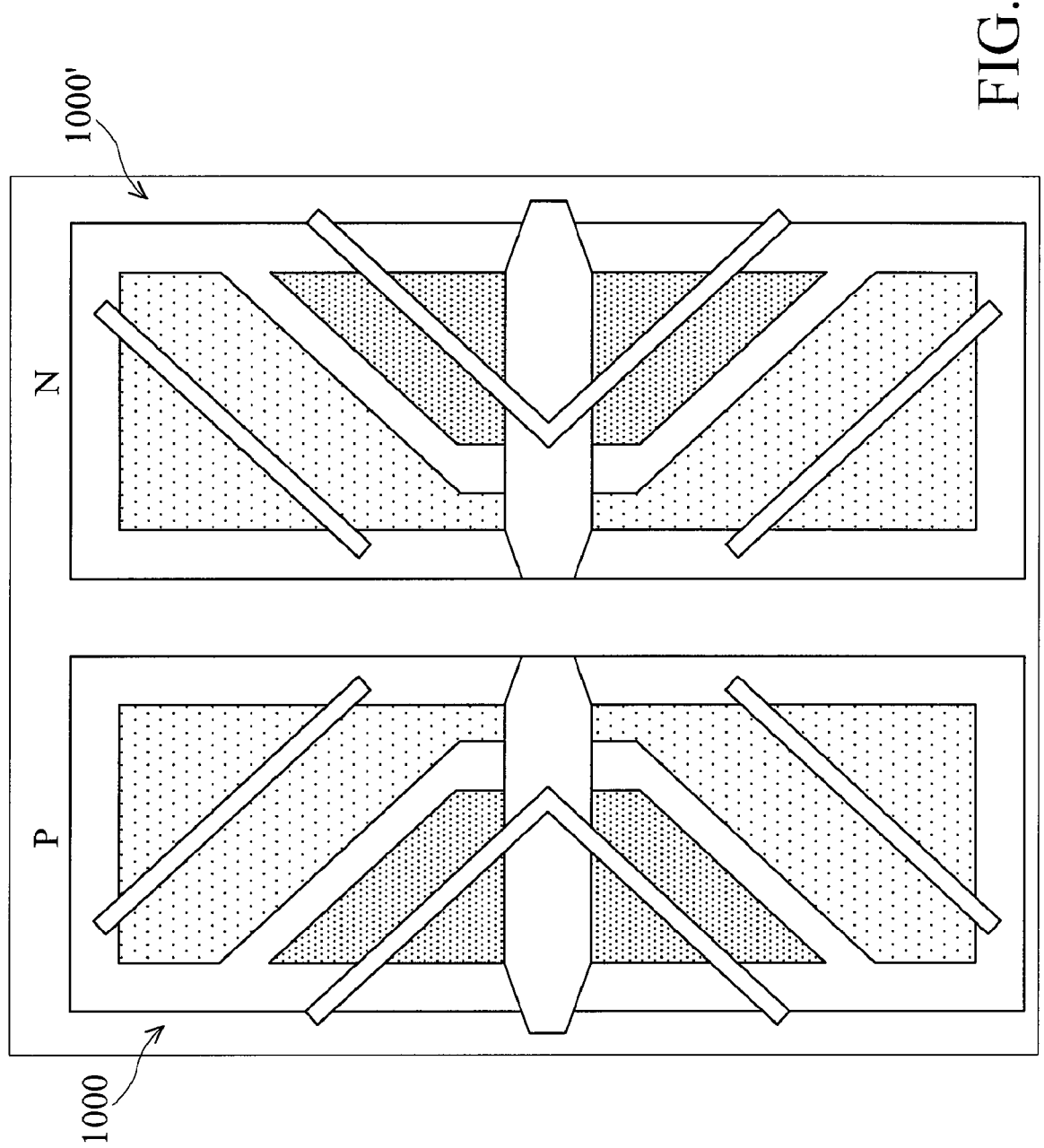
FIG. 11 is a plan view of another embodiment of a multi-domain vertical alignment liquid crystal display.
Figure 12:
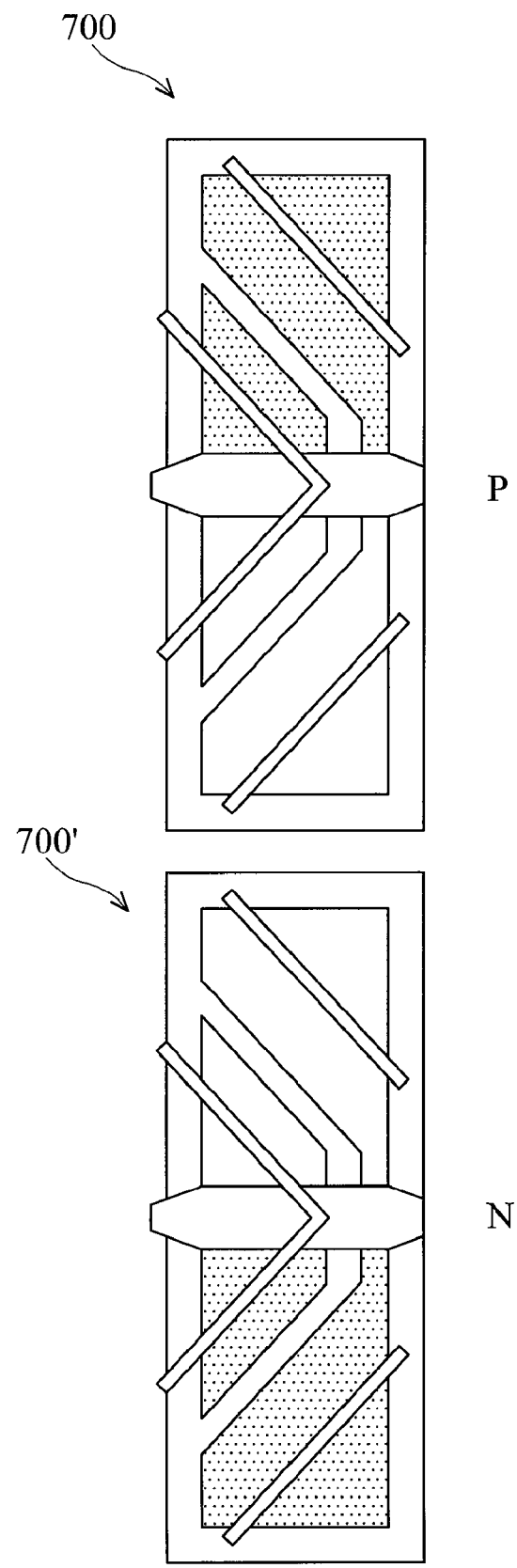
FIG. 12 is a plan view of another embodiment of a multi-domain vertical alignment liquid crystal display.

This embodiment is based on the previously described four embodiments, i.e. arrangement of a sub-pixel and its mirror image for a pixel structure in a multi-domain vertical alignment liquid crystal display. As shown in FIGS. 5 and 11, the sub-pixel structure 1000 in first and second embodiments is P (positive) type sub-pixel, and its mirror image 1000' is N (negative) type sub-pixel. As shown in FIGS. 8 and 12, the sub-pixel structure 700 in first and second embodiments is P (positive) type sub-pixel, and its mirror image 700' is N (negative) type sub-pixel. Accordingly, as shown in FIG. 13, arrangement of sub-pixels in this embodiment includes various combinations. That is, mirror mapped sub-pixels are set with respect to a horizontal or vertical line. Moreover, any three adjacent sub-pixels comprise red, blue and green sub-pixels. Any two adjacent sub-pixels belong to different type (P type or N type).

Sixth Embodiment

FIG. 14 shows pixel structure arrangement of a sixth embodiment of a multi-domain vertical alignment liquid crystal display. This embodiment is similar to the fifth embodiment, except that a number of mirror mapped units A are set with respect to a horizontal or vertical line. Specifically, each unit "A" consists of three P type or N type sub-pixels, and includes red, blue and green sub-pixels. Any two adjacent units A are a different type (P type or N type).

Seventh Embodiment

FIG. 15 shows pixel structure arrangement of a seventh embodiment of a multi-domain vertical alignment liquid crystal display. This embodiment is similar to the sixth embodiment, except that a number of mirror mapped units B are set with respect to a horizontal or vertical line. Specifically, each unit B consists of 3n of P type or N type sub-pixels, wherein n is a positive integer larger than 1, such as 2, 3, 4, etc. Any three adjacent sub-pixels include red, blue and green sub-pixels. Any two adjacent units "B" are a different type (P type or N type).

Eighth Embodiment

FIG. 16 shows pixel structure arrangement of an eighth embodiment of a multi-domain vertical alignment liquid crystal display. This embodiment is similar to the seventh embodiment, except that a number of mirror mapped units C are set with respect to a horizontal or vertical line. Specifically, each unit C consists of two rows of P type or N type sub-pixels, and each row includes 3n of P type or N type sub-pixels, wherein n is a positive integer larger than 1, such as 2, 3, 4, etc. Any three adjacent sub-pixels include red, blue and green sub-pixels. Any two adjacent units C are a different type (P type or N type).

According to embodiments of the invention, by means of setting mirror mapped sub-pixels with respect to a horizontal or vertical line, thus characteristics such as azimuthal angle domain area ratio self compensation are obtained.

Figure 17:
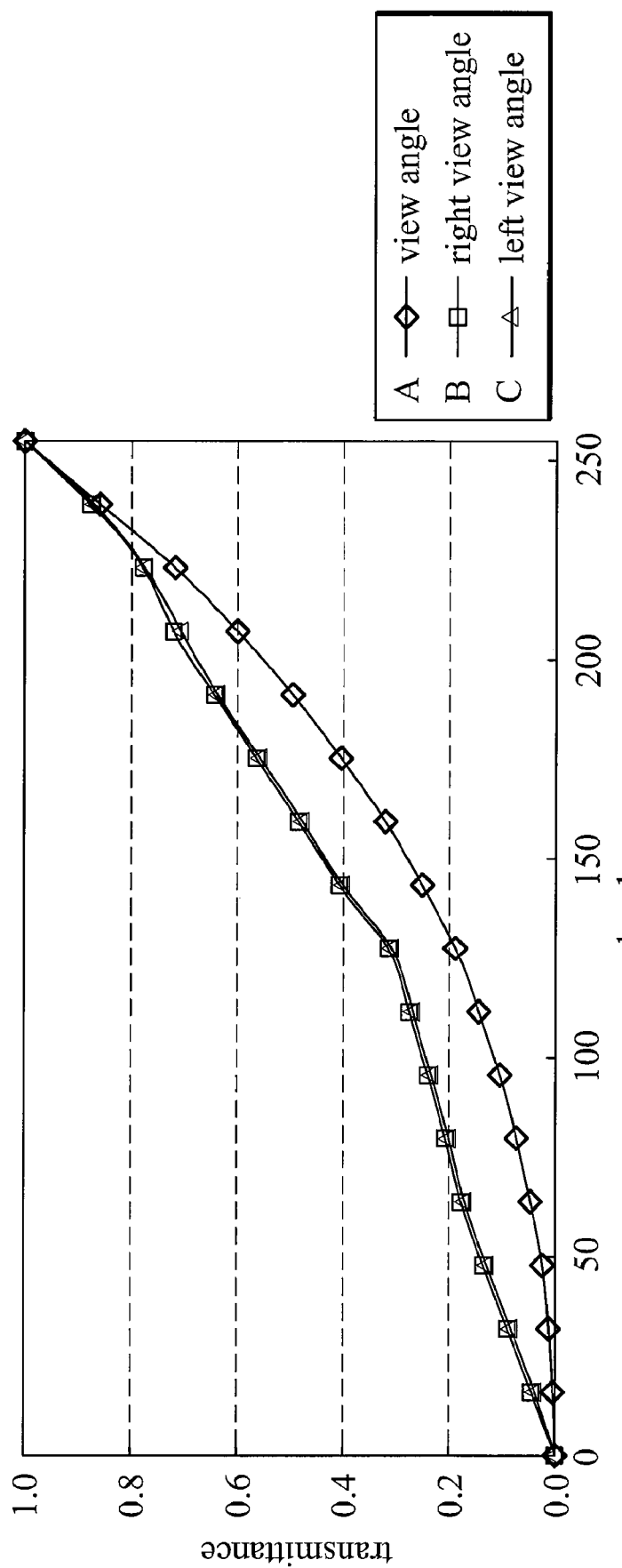
FIG. 17 is a diagram showing the relation of the γ curve vs. the viewing angle for a first embodiment of a multi-domain vertical alignment liquid crystal display.

FIG. 17 is a diagram showing the relationship of the γ curve vs. the viewing angle for a first embodiment of a multi-domain vertical alignment liquid crystal display, and curves A, B and C denote γ curves at viewing angle 0°, right viewing angle and left viewing angle, respectively. Note that curve B substantially matches curve C. Thus it can be seen that excellent display quality, i.e. uniformity of display quality at left-right or up-down viewing angle, is achieved.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pixel structure for a multi-domain vertical alignment liquid crystal display, comprising
  a pixel array comprising a plurality of sub-pixels adjacently arranged;
  a first substrate comprising a first means; and
  a second substrate comprising a second means, and a layer of liquid crystal molecules interposed between the first and second substrates, wherein the first and second means are employed for controlling tilt angles of the liquid crystal molecules;
  wherein the first and second means are alternately disposed to divide each of the sub-pixels into a plurality of different azimuthal angle domains;
  wherein each of the sub-pixels comprises at least two different polar angle domains having at least two different potentials respectively, and wherein the azimuthal angle domains and polar angle domains of two adjacent sub-pixels have a mirror-image arrangement.

2. The pixel structure as claimed in claim 1, wherein the sub-pixel comprises four different azimuthal angle domains.

3. The pixel structure as claimed in claim 2, wherein the sub-pixel comprises azimuthal angle domains at 45°, 135°, 225°, 315°, respectively.

4. The pixel structure as claimed in claim 1, wherein the sub-pixel comprises two different polar angle domains.

5. The pixel structure as claimed in claim 4, wherein the sub-pixel comprises two different symmetric polar angle domains.

6. The pixel structure as claimed in claim 4, wherein the sub-pixel comprises two different asymmetric polar angle domains.

7. The pixel structure as claimed in claim 1, wherein total area of each azimuthal angle domain in a same polar angle is substantially the same in two adjacent sub-pixels having a mirror-image arrangement.

8. The pixel structure as claimed in claim 1, wherein the mirror-image arrangement of adjacent sub-pixels refers to that every three sub-pixels and every three mirror-images of the sub-pixels are periodically arranged.

9. The pixel structure as claimed in claim 8, wherein the three sub-pixels comprise red, green and blue sub-pixels.

10. The pixel structure as claimed in claim 1, wherein the mirror-image arrangement of adjacent sub-pixels refers to that every more than three sub-pixels and every more than three mirror-images of the sub-pixels are periodically arranged.

11. The pixel structure as claimed in claim 10, wherein the three sub-pixels comprise red, green and blue sub-pixels.

12. The pixel structure as claimed in claim 1, wherein the first and second means comprises a protrusion portion or a slit.

13. The pixel structure as claimed in claim 1, further comprising:
a pixel electrode being a stand-alone structure in the different polar angle domains of the sub-pixel.

14. A pixel structure for a multi-domain vertical alignment liquid crystal display, comprising
a pixel array comprising a plurality of sub-pixels adjacently arranged;
a liquid crystal layer interposed between a first and second substrates;
wherein one sub-pixel of the second substrate comprises a first polar domain and a second polar domain at different potential, and both first and second polar domains are further divided into a plurality of azimuthal domains;
wherein at least one adjacent sub-pixel comprises the polar domains and the azimuthal domains in a mirror-image arrangement;
an active device is electrically connected to the first polar domain of the second substrate via a data line; and
a capacitive coupling electrode disposed below the second polar domain electrically connected to the data line through the active device.

15. The pixel structure as claimed in claim 14, wherein the active device comprises a first thin film transistor.

16. The pixel structure as claimed in claim 14, further comprise a pixel electrode being a stand-alone structure in the first and second polar angle domains.

17. The pixel structure as claimed in claim 14, wherein the sub-pixel comprises four different azimuthal angle domains.

18. The pixel structure as claimed in claim 14, wherein the sub-pixel comprises azimuthal angle domains at 45°, 135°, 225°, 315°, respectively.

19. The pixel structure as claimed in claim 14, wherein the sub-pixel comprises two different symmetric polar angle domains.

20. The pixel structure as claimed in claim 14, wherein the sub-pixel comprises two different asymmetric polar angle domains.

21. The pixel structure as claimed in claim 14, wherein total area of each azimuthal angle domain in a same polar angle is substantially the same in two adjacent sub-pixels having a mirror-image arrangement.

22. The pixel structure as claimed in claim 14, wherein the mirror-image arrangement of adjacent sub-pixels refers to that every three sub-pixels and every three mirror-images of the sub-pixels are periodically arranged.

23. The pixel structure as claimed in claim 22, wherein the three sub-pixels comprise red, green and blue sub-pixels.

24. The pixel structure as claimed in claim 14, wherein the mirror-image arrangement of adjacent sub-pixels refers to that every more than three sub-pixels and every more than three mirror-images of the sub-pixels are periodically arranged.

25. The pixel structure as claimed in claim 24, wherein the three sub-pixels comprise red, green and blue sub-pixels.

26. The pixel structure as claimed in claim 14, further comprising:
a first means on the first substrate; and
a second means on the second substrate;
wherein the first and second means are employed for controlling tilt angles of the liquid crystal molecules.

27. The pixel structure as claimed in claim 26, wherein the first and second means comprises a protrusion portion or a slit.

28. The pixel structure as claimed in claim 14, further comprising:
a charge releasing device being electrically connected to the second polar angle domain of the second substrate by means of a data line.

29. The pixel structure as claimed in claim 14, wherein the charge releasing device comprises a capacitor.

30. The pixel structure as claimed in claim 14, wherein the active device comprises a first thin film transistor; the charge releasing device comprises a second thin film transistor, wherein a W/L value of the second thin film transistor is less than that of the first thin film transistor.

31. The pixel structure as claimed in claim 1, further comprising at least two thin film transistors electrically connected to the at least two different polar angle domains to provide at least two different potentials respectively.

32. The pixel structure as claimed in claim 1, further comprising an active device and a capacitive coupling electrode, wherein the active device is electrically connected to one of the at least two polar domains, and the capacitive coupling electrode is electrically connected to the active device and disposed below the other one of the at least two polar domains to provide at least two different potentials respectively.

33. The pixel structure as claimed in claim 1, wherein the pub-pixels are divided into a plurality of positive type sub-pixels and a plurality of negative type sub-pixels periodically arranged.

* * * * *